(12) United States Patent
Johansen et al.

(10) Patent No.: US 11,603,822 B2
(45) Date of Patent: Mar. 14, 2023

(54) METHOD OF ERECTING A WIND TURBINE

(71) Applicant: Vestas Wind Systems A/S, Aarhus N (DK)

(72) Inventors: Rasmus Sanderhoff Johansen, Hørning (DK); Søren Bøgelund Madsen, Aarhus N (DK); Jes Grøn Andersen, Skødstrup (DK); Jakob Anders Sørensen, Fredericia (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/730,654

(22) Filed: Apr. 27, 2022

(65) Prior Publication Data

US 2022/0252047 A1 Aug. 11, 2022

Related U.S. Application Data

(63) Continuation of application No. 17/254,343, filed as application No. PCT/DK2019/050207 on Jun. 26, 2019, now Pat. No. 11,346,324.

(30) Foreign Application Priority Data

Jun. 29, 2018 (DK) .......................... PA 2018 70449

(51) Int. Cl.
*F03D 13/20* (2016.01)
*F03D 7/02* (2006.01)
(Continued)

(52) U.S. Cl.
CPC .......... *F03D 13/20* (2016.05); *F03D 7/0296* (2013.01); *F03D 13/10* (2016.05); *F03D 13/35* (2016.05);
(Continued)

(58) Field of Classification Search
CPC .......... F03D 13/10; F03D 13/20; F03D 13/35; F03D 7/0296; F05B 2240/912; F05B 2240/916; F05B 2260/964
See application file for complete search history.

(56) References Cited

U.S. PATENT DOCUMENTS 8,123,484 B2   2/2012   Choi et al.
8,641,369 B2   2/2014   Rodriguez Tsouroukdissian
(Continued)

FOREIGN PATENT DOCUMENTS

EP   2522850 A2   11/2012
EP   3048295 A1    7/2016
(Continued)

OTHER PUBLICATIONS

Intellectual Property India, Examination Report in IN Application No. 202117001886_Jul. 19, 2022.
(Continued)

*Primary Examiner* — Courtney D Heinle
*Assistant Examiner* — Ryan C Clark
(74) *Attorney, Agent, or Firm* — Wood Herron & Evans LLP

(57) ABSTRACT

A method of erecting a wind turbine on a wind turbine site, the wind turbine comprising a turbine tower and a nacelle. The method comprises the following steps: providing a plurality of tower sections being arrangeable upon each other in a vertical orientation in a tower structure to form the turbine tower; providing at least one damper unit configured to dampen oscillations of the turbine tower; attaching a damper unit to one of the plurality of the tower sections on an outside thereof, and subsequently arranging the tower section in the tower structure, and arranging the nacelle on top of the tower structure while the damper unit is attached to a tower section in the tower structure.

12 Claims, 9 Drawing Sheets

(51) Int. Cl.
*F03D 13/10* (2016.01)
*F03D 13/35* (2016.01)

(52) U.S. Cl.
CPC ... *F05B 2240/912* (2013.01); *F05B 2240/916* (2013.01); *F05B 2260/964* (2013.01)

(56) References Cited

U.S. PATENT DOCUMENTS

| | | | |
|---|---|---|---|
| 9,896,310 | B2 | 2/2018 | Seidel |
| 2006/0147306 | A1 | 7/2006 | Zheng et al. |
| 2010/0314883 | A1 | 12/2010 | Ollgaard |
| 2012/0304588 | A1 | 12/2012 | von Ahn |
| 2015/0211496 | A1 | 7/2015 | Frydendal |
| 2016/0252079 | A1 | 9/2016 | Ollgaard et al. |
| 2017/0121998 | A1 | 5/2017 | Carrillo Alonso et al. |
| 2018/0017125 | A1 | 1/2018 | Amdisen et al. |
| 2018/0282134 | A1 | 10/2018 | Lagerweij et al. |
| 2019/0048855 | A1 | 2/2019 | Rodriguez Tsouroukdissian |

FOREIGN PATENT DOCUMENTS

| | | | | |
|---|---|---|---|---|
| EP | 3048299 | A1 | | 7/2016 |
| EP | 3511566 | A1 * | 7/2019 | ............ F03D 13/10 |
| JP | 2006207502 | A * | 8/2006 | |
| JP | 2006207502 | A | | 8/2006 |
| KR | 20140055667 | A | | 5/2014 |
| NL | 1041499 | B1 | | 4/2017 |
| WO | 2011099915 | A1 | | 8/2011 |
| WO | WO-2020125886 | A1 * | 6/2020 | ............ F03D 13/20 |

OTHER PUBLICATIONS

Danish Patent and Trademark Office, Search and Examination Report in PA 2018 70449, dated Dec. 3, 2018.
European Patent Office, International Search Report and Written Opinion in PCT Application No. PCT/DK2019/050207, dated Aug. 27, 2019.
European Patent Office, Extended Search Report in EP Application No. 22169753.5, dated Jul. 8, 2022.

* cited by examiner

METHOD OF ERECTING A WIND TURBINE

CROSS REFERENCE TO RELATED APPLICATIONS

This application is a continuation of U.S. patent application Ser. No. 17/254,343, filed Dec. 21, 2020 (pending), which is a U.S. National Phase Application of PCT Application No. PCT/DK2019/050207, filed Jun. 26, 2019 (expired), which claimed the priority of Danish Application No. 2018 70449, filed Jun. 29, 2018, the disclosures of which are incorporated by reference herein in their entirety.

FIELD OF THE INVENTION

The present invention relates to a method of erecting a wind turbine by use of a damper unit.

BACKGROUND OF THE INVENTION

Modern wind turbines are used for generating electrical energy for a power grid. To this end, a set of wind turbine blades coupled to a rotor are directed into the incoming wind, and the energy of the wind is extracted by the wind turbine blades and causes the rotor to rotate, thereby converting the energy of the wind into mechanical energy. The rotor is connected to a generator, either directly or via a gear arrangement, and thereby the mechanical energy of the rotating rotor is converted into electrical energy. The electrical energy is supplied to a power grid, via suitable components.

Over the years, the size and dimensions of the wind turbines have generally increased in order to increase the amount of energy extracted from the wind and the annual power output. With the significantly longer blades and larger generators follow correspondingly higher wind turbine towers, larger and significantly heavier nacelles and larger bearings etc. The tower and foundation thereby naturally need to be dimensioned to carry the larger loads and vibrations caused by the wind acting on the larger and heavier system.

Consequently, a wind turbine tower often comprises a plurality of tower sections. When erecting the wind turbine, the plurality of tower sections are installed on top of each other, and a nacelle is installed on top of the upper most tower section.

During installation of the tower sections and the nacelle, Vortex-induced vibrations may occur. This is due to the phenomena known as vortex shedding that is a particular problem with high slender towers of a height from approximately 80 meters and upwards.

Vortex shedding occurs due to instability of the flow around an object, such as a wind turbine tower. Low-pressure vortices are created on the downstream side of the tower and intermittently detach from either side of the tower. The tower will tend to move towards the low pressure, i.e., an alternating force is applied to the tower. The frequency by which the force alternates from side to side depends on the diameter of the tower and the wind speed. At a certain wind speed the frequency of the alternating force coincides with the natural frequency of the wind turbine tower, i.e., the tower frequency of the wind turbine tower. This wind speed is known as the critical wind speed. At this wind speed the tower will start to oscillate.

The amplitudes of the oscillations at the critical wind speeds depend on the structural damping of the wind turbine tower. If no additional damping is added to the wind turbine tower the oscillations can result in severe deflections of the wind turbine tower.

The effects of vortex shedding are especially pronounced during construction of the tower until the nacelle has been installed, as this changes the natural frequency of the system. Should the tower start to oscillate at some point during construction of the tower, it is necessary to stop further construction and wait until the wind speed is below the critical wind speed again. In such a situation it is impossible to apply mitigating measures to stop the oscillations. Personnel safety may be compromised and structural damage to the tower may occur. Therefore, it is required to have a weather window with wind speeds below the critical wind speed during construction of the tower until the nacelle has been installed.

This may prolong the erection time of the wind turbine.

DESCRIPTION OF THE INVENTION

It is an object of embodiments of the invention to provide an improved method of erecting a wind turbine.

It is a further object of embodiments of the invention to provide a method of reducing the risk of vortex induced vibrations during erection of a wind turbine tower.

According to a first aspect, the invention provides a method of erecting a wind turbine on a wind turbine site, the wind turbine comprising a turbine tower and a nacelle, the method comprising the following steps:

providing a plurality of tower sections being arrangeable upon each other in a vertical orientation in a tower structure to form the turbine tower, providing at least two damper units configured to dampen oscillations of the turbine tower, attaching one of the at least two damper units to one of the plurality of the tower sections on an outside thereof, and subsequently arranging said tower section in the tower structure, attaching a subsequent one of the at least two damper units to another one of the plurality of the tower sections on an outside thereof, and subsequently arranging said tower section in the tower structure, while the previous one of the at least two damper units is still attached to the previous one of the plurality of tower sections.

It is herewith achieved that oscillations of the tower structure can be dampened at all times during the part of the erection where the tower structure has a height where vortex induced vibrations can occur. Thus, the critical wind speed where vortex induced oscillations occur is higher and thereby allows for erecting towers in higher wind speeds. Therefore the allowable weather window for installing towers can be expanded. In the context of the present invention, the term "weather window" should be understood as a time period where the weather does not hinder erection of the turbine tower.

Since the damper is arranged on the outside of the tower section, it is possible to work inside the tower section during assembly of the tower sections as the damper does not take up space inside the tower, and since the tower section is arranged in the tower structure after the damper is attached on the outside, the damper can operate to dampen oscillations already during the assembly of the tower. Moreover, it is easier to mount a damper on the ground as compared to mounting it in high altitude.

After erecting the wind turbine, the wind turbine comprises an elongated turbine tower which is formed by a plurality of tower section arranged upon each other in a vertical orientation and a nacelle. The tower sections may each be of the same height. However, at least some of the tower sections may be different height.

When erecting the wind turbine the lowermost turbine section may be arranged on a foundation.

When arranging a tower section upon another tower section, the two neighbouring tower sections may be attached to each other e.g., by fixing a top tower flange of the lower one of the tower sections to a bottom tower flange of the upper one of the tower sections.

When the uppermost tower section has been arranged, a nacelle may be arranged on top of the turbine tower.

The method comprises a step of providing a plurality of tower sections being arrangeable upon each other in a substantially vertical tower structure to form the turbine tower. The plurality of tower sections may be arranged at the site where the wind turbine is to be erected. The tower structure may be erected on a pre-cast foundation for the wind turbine tower. The tower structure may comprise one tower section or more tower sections arranged upon each other. Thus, in the context of the present invention, the term "tower structure" should be understood as the part of the turbine tower which has been erected at any time during the erection of the wind turbine. Consequently, the height of the tower structure increases during erection of the wind turbine as more tower sections are installed, so that the tower structure at a later stage may comprise a plurality of tower sections.

The damper units which are configured to reduce oscillations of the turbine tower may each comprise an active damper or a passive damper. Advantageously the damper may be a passive tuned mass damper, where the damping frequency is manually or automatically adjustable to cater for the variations of the natural frequency of the tower especially during the later stages of the erection of the wind turbine tower.

In one embodiment, the damper units may comprise a damper unit structure adapted for attachment to the tower structure, a pendulum structure, a suspension arrangement for suspending the pendulum structure from the damper unit structure such that the pendulum structure is allowed to displace from a neutral position for the pendulum structure, the suspension arrangement comprising one or more wires for suspending the pendulum structure, a sensor adapted for measuring movements of the tower structure, and tuning means configured for adjusting the natural frequency of the suspended pendulum structure in response to measured movements of the tower structure.

The method comprises a step of attaching one of the damper units to one of the plurality of tower sections on an outside thereof, which tower section is a tower section positioned on the site and being configured to be arranged in the tower structure to thereby form part of the turbine tower.

Subsequent to the step of attaching the damper unit to the tower section, the tower section is arranged in the tower structure. Consequently, a tower section is arranged in the tower structure with a damper unit attached hereto.

As mentioned above, the tower structure is erected upon a prepared foundation for the wind turbine tower and may comprise one tower section or more tower sections arranged upon each other. Thus, the above mentioned tower section with the damper unit attached may be arranged on the foundation and attached hereto when arranging the tower section in the tower structure. However, as would be more common, the tower section first having a damper unit attached during the erection may be arranged on top of a partly finished tower structure comprising one or more tower sections having previously been arranged in the tower structure and attached thereto.

The method further comprises a step of attaching a subsequent damper unit to another tower section on an outside thereof, and a step of arranging this tower section in the tower structure. As this damper unit is attached to a subsequent tower section which is arranged in the tower structure while the previous damper unit is still attached to the previous tower section, it is achieved that at least one damper unit can be attached to the tower structure while erecting the turbine tower, and thereby ensure that dampening of oscillations is possible during the entire erection process. Moreover, it may be achieved that at least one damper unit is attached to the tower structure at all times during the remaining part of the erection process after arranging a tower section in the tower structure for the first time before the tower section has a height where vortex induced vibrations may become critical.

The subsequent tower section may be arranged on top of the previous tower section whereby these tower sections are two neighbouring tower sections. It should however, be understood, that another tower section, such as a tower section without a damper unit attached hereto can be arranged between these tower sections, such as on top of the previous tower section prior to the step of arranging the subsequent tower section with the subsequent damper unit in the tower structure.

In a further embodiment, a plurality of tower sections without a damper unit attached hereto are arranged on top of the previous tower section prior to the step of arranging the subsequent tower section with the subsequent damper unit in the tower structure.

The nacelle may be arranged on top of the tower structure while at least one of the two damper units is attached to a tower section in the tower structure. Consequently, vortex induced vibrations may be prevented or at least reduced throughout the entire erection procedure until completion of the nacelle mounting or throughout the remaining erection procedure after mounting a tower section with a damper unit for the first time. Subsequent to the attachment of the nacelle, the at least one damper unit may be removed, as the nacelle together with the turbine tower may be designed with a natural frequency that does not coincide with the frequency where vortex induced vibrations occur, whereby a separate damper unit may be omitted.

The method may comprise a further step of attaching a hoisting system to at least one of the damper units and releasing said damper unit from the tower section to which it is attached in the tower structure and lowering said damper unit to the site.

After lowering the damper unit to the ground at the site, the damper unit may be attached to a subsequent tower section which may e.g., be located at the ground or on transportation means, such as a vehicle, at the site, where the wind turbine is erected.

The subsequent tower section may be arranged in the tower structure on top of a tower section to which a damper unit is attached or on top of another tower section, i.e., a tower section without a damper unit attached.

The hoisting system may as an example form part of a hoist, a winch, or a crane structure to thereby enable lifting of a tower structure and/or a damper unit.

The step of arranging one of the tower sections in the tower structure may comprise a step of lifting the hoisting system and said tower section, arranging the tower section in the tower structure, detaching the tower section from the hoisting system, attaching the hoisting system to one of the damper units attached to another tower section in the tower structure, and lowering the hoisting system and said damper unit.

Thus, the hoisting system may be attached to a damper unit which is attached to a tower section in the tower structure, and after release herefrom lowered to another tower section on site and attached hereto. By performing this step subsequent to a step of attaching another damper unit to another tower section and arranging said tower section in the tower structure, it may be achieved that a damper unit is still attached to the tower structure, when the previous damper unit is released from a previous tower section in the tower structure.

The step of arranging a subsequent tower section in the tower structure and releasing a previous damper unit may be carried out by steps of attaching a hoisting system to the subsequent tower section to thereby enable lifting hereof to arrange it in the tower structure, subsequently lifting the hoisting system and the subsequent tower section, arranging the subsequent tower section in the tower structure, detaching the subsequent tower section from the hoisting system, attaching the hoisting system to the previous damper unit, and lowering the hoisting system and the previous damper unit. Consequently, the step of arranging the subsequent tower second in the tower structure and the step of lowering the previous damping unit may be carried out without an intermediate step of lowering the hoisting structure. Thus, the number of lifting operations is optimized.

In one embodiment, the step of attaching the hoisting system to one of the damper units in the tower structure is carried out before the step of detaching the tower section from the hoisting system. The step of attaching the hoisting system to the damper unit attached to a tower section on an outside thereof in the tower structure may be performed by workers who are ready to attach the next tower section to the tower section which is presently the uppermost tower section in the tower structure. The workers may stand on a platform inside the tower section in the tower structure from which position they can attach the hoisting system to the damper unit attached to the tower section in the tower structure before the next tower section is brought into alignment with the tower structure and attached to the uppermost tower section.

It should however, be understood that the hoisting system in an alternative embodiment may be attached to the damper unit by robot means which may e.g., be controlled by a controller for controlling the hoisting system.

The hoisting system may comprise a tower section lifting sling and a damper unit lifting sling. Each sling may comprise attachments means configured for attachment of a tower section and a damper unit, respectively, e.g., by engagement with a corresponding attachment feature on the tower section and the damper unit. The damper unit lifting sling have a length exceeding a height of a lifted tower section, whereby the step of attaching the hoisting system to a damper unit may be carried out while the hoisting system is attached to an upper end of a tower section being arranged on top of a tower section already in the tower structure to which tower section, the damper unit is attached.

In one embodiment, the step of attaching one of the at least two damper units to one of the plurality of the tower sections on an outside thereof for the first time, and subsequently arranging said tower section in the tower structure may be carried out when a predetermined number of tower sections has been arranged in the tower structure. As an alternative, the step may be carried out when the tower structure has reached a predetermined height. The predetermined number of tower sections and/or the predetermined height may be specified based on an assessment of and/or a calculation of the risk of occurrence of oscillations of the tower structure. The assessment/calculation may as an example include weather data for the specific site and data relating to the layout of the tower sections, such as height, diameter, weight, etc.

It should be understood, that the steps of attaching one of the damper units to a tower section and subsequently arranging the tower section with the damper unit in the tower structure may be repeated a plurality of times until all tower sections are arranged in the tower structure and the turbine tower is erected. It should be understood, that some tower sections may be arranged with a damper unit attached to an outside thereof, whereas other tower sections may be arranged without a damper unit attached.

The at least two damper units may be alternatingly attached to a tower section, whereby a damper unit may be arranged at the tower structure the entire time after arranging a tower section with a damper unit in the tower structure for the first time.

The step of releasing one of the damper units from a tower section in the tower structure may comprise a step of determining tension in the hoisting system, and based on the determined tension, to select a state where said damper unit can be released from the tower section. By sensing tension in the hoisting system, it may be possible to detect whether the damping unit is attached to the hoisting system and fully supporting the weight of it or not. Consequently, by monitoring tension it may be possible to determine whether the hoisting system has grabbed the damping unit or not. If the determined tension is below a predetermined threshold value, the damping unit may not be released. On contrary, if the determined tension is above a predetermined threshold value, the damping unit may be released, as the determined tension may prove, that the hoisting system has grabbed the damping unit which may consequently be released from the tower section.

A previous step of lifting the hoisting system may facilitate determination of tension in the hoisting system. Thus, the step of lowering the hoisting system and at least one of the damper units may be subsequent to a step of lifting the hoisting system and the damper unit.

The step of lowering one of the damper units may comprise a step of rotating said damper unit approximately 90 degrees before attaching the damper unit to the a subsequent one of the plurality of tower sections. Dependent on the location and/or orientation of the tower sections on ground or on transportation means or on other means on the wind turbine site, it may be necessary to attach the damping unit at differing positions on the outside of the different wind turbine sections. As an example, a damper unit may, in one embodiment, be attached in a 12 o'clock position of a horizontal tower section on an outside thereof, whereas the same damper unit may in another embodiment be attached in a 3 or 9 o'clock position of a horizontal tower section on an outside thereof.

If a damper unit is not to be attached to another tower second, when released and lowered from a tower section, it may be an advantage if the damper unit in question can be parked at the site until the damper unit is to be used again. Consequently, the step of lowering a damper unit may comprise a further step of parking said damper unit on the site before attaching said damper unit to a subsequent tower section. The step of parking the damper unit may form part of the step of rotation the damper unit, as the damper unit may adventurously be parked before the step of rotating the damper unit. To facilitate parking of the dampen unit, a parking unit facilitating support of the damper unit on ground may be provided.

In order to attach one of the at least two damper units to a tower section, the step of attaching the damper unit to one of the plurality of tower sections may comprise a step of providing at least one through hole in a wall of the tower section and fixing said damper to the tower section by a locking structure extending through the through hole. The at least one through hole may be provided at the manufacturing site for the turbine sections, whereby the through hole(s) may be provided as part of the manufacturing process for the tower sections.

The locking structure may form part of the at least one damper unit, whereby it may be inserted into the at least one thought hole when aligning the damper unit with the tower section.

Alternatively, the step of fixing the damper to the tower section by a locking structure extending through the through hole may be carried out by workers who are ready to fix a tower section to the tower section which is presently the uppermost tower section in the tower structure. As mentioned above, the workers may stand on a platform inside the tower section from which position they may insert the locking structure into the through hole(s) to engage the damper unit.

Alternatively or additionally, the step of attaching one of the at least one damper unit to an outside of one of the plurality of tower sections may comprise a step of providing at least one shelf support on the outside of the tower section and a step of fixing the damper unit to the tower section by engagement between the shelf support and a part of the damper unit. The damper unit may be supported by the shelf support(s). In one embodiment, the shelf support(s) may comprise at least on recess into which at least a part of the damper unit may be inserted to thereby further fix the damper unit to the tower section.

To facilitate damping of oscillations it may be an advantage, if the first and/or second damper unit is arranged in a predetermined position, such as in a vertical position. Thus, the step of attaching one of the at least two damper units to one of the plurality of tower sections may comprise a step of providing at least one pivoting structure between the damper unit and the tower section and a step of aligning the damper unit by reorienting the pivoting structure relative to the tower section. The pivoting structure may form part of the damper unit or the tower section or may be a separate structure attachable to at least one of the damper unit and the tower structure. By reorienting the pivoting structure, it may be assured that the damping unit is attached to the tower structure in the required orientation.

In one embodiment, the pivoting structure may be provided as at least one foot attached to the damping unit. Consequently, the damping unit may be aligned with tower sections of different size and/or different outer geometry by reorienting the pivoting structure.

A damping frequency of at least one of damper units may be variable. The method may comprise a step of varying the damping frequency in dependency of the number of tower sections in the tower structure and/or in dependency of the natural frequency of the tower structure. Consequently, it may be possible to use the damping units at different height of the tower structure and thus reuse the damping unit(s) during the erection of the turbine tower. Because the damper may cater for the changes in natural frequency of the tower during erection of the tower structure.

According to a second aspect, the invention provides a damper unit for use in a method according to the first aspect of the invention, the damper unit comprising:
- a damper unit structure adapted for attachment to the tower structure,
- a pendulum structure,
- a suspension arrangement for suspending the pendulum structure from the damper unit structure such that the pendulum structure is allowed to displace from a neutral position for the pendulum structure, the suspension arrangement comprising one or more wires for suspending the pendulum structure,
- a sensor adapted for measuring movements of the tower structure, and
- tuning means configured for adjusting the natural frequency of the suspended pendulum structure in response to measured movements of the tower structure.

It should be understood, that a skilled person would readily recognise that any feature described in combination with the first aspect of the invention could also be combined with the second aspect of the invention, and vice versa.

The damper unit according to the second aspect of the invention is very suitable for performing the method steps according to the first aspect of the invention. The remarks set forth above in relation to the method are therefore equally applicable in relation to the damper unit.

According to a third aspect, the invention provides a hoisting system for use in a method according to the first aspect of the invention, the hoisting system comprising a tower section lifting sling and a damper unit lifting sling, wherein said damper unit lifting sling has a length exceeding a height of a tower section, whereby the hoisting system is attachable to a damper unit being attached to a tower section in the tower structure while being attached to an upper end of a subsequent tower section being arranged on top of said tower section.

It should be understood, that a skilled person would readily recognise that any feature described in combination with the first and second aspects of the invention could also be combined with the third aspect of the invention, and vice versa.

The hoisting system according to the third aspect of the invention is very suitable for performing the method steps according to the first aspect of the invention. The remarks set forth above in relation to the method are therefore equally applicable in relation to the hoisting system.

According to a fourth aspect, the invention provides a method of erecting a wind turbine on a wind turbine site, the wind turbine comprising a turbine tower and a nacelle, the method comprising the following steps:
- providing a plurality of tower sections being arrangeable upon each other in a vertical orientation in a tower structure to form the turbine tower,
- providing at least one damper unit configured to dampen oscillations of the turbine tower,
- attaching a damper unit to one of the plurality of the tower sections on an outside thereof, and subsequently arranging said tower section in the tower structure, and
- arranging the nacelle on top of the tower structure while said damper unit is attached to a tower section in the tower structure.

It should be understood, that a skilled person would readily recognise that any feature described in combination with the first, second, and third aspects of the invention could also be combined with the fourth aspect of the invention, and vice versa.

The damper unit according to the second aspect and the hoisting system according to the third aspect of the invention are very suitable for performing the method steps according to the fourth aspect of the invention. The remarks set forth above in relation to the damper unit and the hoisting system are therefore equally applicable in relation to the method. Furthermore, the method step of the first aspect are very suitable for performing the method steps according to the fourth aspect of the invention. The remarks set forth above in relation to the method according to the first aspect are therefore equally applicable in relation to the method according to the fourth aspect.

A separate invention may be found in a method of erecting a wind turbine having a tower structure, the method comprising providing a plurality of tower sections, forming the tower structure by arranging the plurality of tower sections upon each other in a vertical orientation in a prescribed tower lay-out, providing and installing the nacelle on top of the tower structure, providing at least one damper unit configured to dampen oscillations of the tower structure during erection of the wind turbine, attaching said at least one damper unit to an outside of a tower section each, prior to arranging said tower section in the tower lay-out such that a damper unit is attached to at least one tower section during installation of the nacelle.

In an embodiment according to the separate invention the method is further defined in that at least two damper units are provided and wherein at least one of said at least two damper units are attached to an outside of a tower section at least during parts of the step of forming the tower structure.

In an embodiment according to the separate invention or the embodiment mentioned immediately above, the method further comprising providing and attaching a hoisting system to one of each damper unit and releasing said one damper unit from its tower section in the tower structure and lowering the damper unit to the ground.

In an embodiment according to the two embodiments mentioned immediately above, the method comprising providing a hoisting system having a tower section lifting sling and a damper lifting sling, said damper lifting sling configured with a length such that it extends below next tower section to be installed, attaching the tower section lifting sling to the next tower section to be installed, lifting the next tower section to be installed to a position adjacent the latest installed tower section, subsequently attaching the damper lifting sling to the damper unit on the latest installed tower section prior to arranging the next tower section to be installed in the tower structure, releasing said damper unit on the latest installed tower section and lowering said damper unit to the ground.

In an embodiment according to the embodiment mentioned immediately above the method is further defined in that the damper unit released from the latest installed tower section is reused for a subsequent next tower section to be installed.

The separate invention may be combined with any of the embodiments of the invention described previously.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

FIG. 1 illustrates steps of a method of erecting a wind turbine on a wind turbine site. The wind turbine comprising a turbine tower 1 (see FIG. 3) and a nacelle 2 (see FIG. 6). By the method a plurality of tower sections 3 is provided on the site. The tower sections 3 are arrangeable upon each other in a vertical orientation in a tower structure to form the turbine tower 1, where the "tower structure" is the part of the turbine tower 1 which has been erected at any time during the erection of the wind turbine.

Figure 1A:
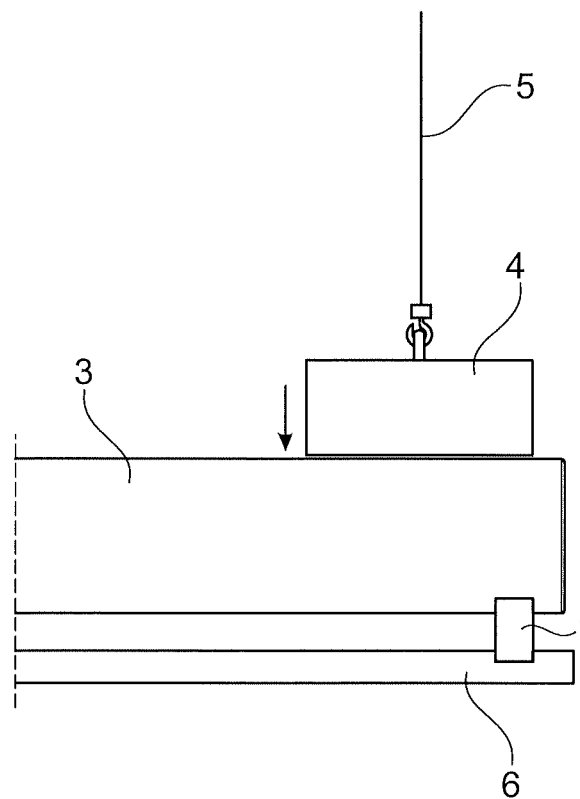
FIGS. 1A and 1B illustrate attachment of a damper unit to a tower section.
Figure 1B:
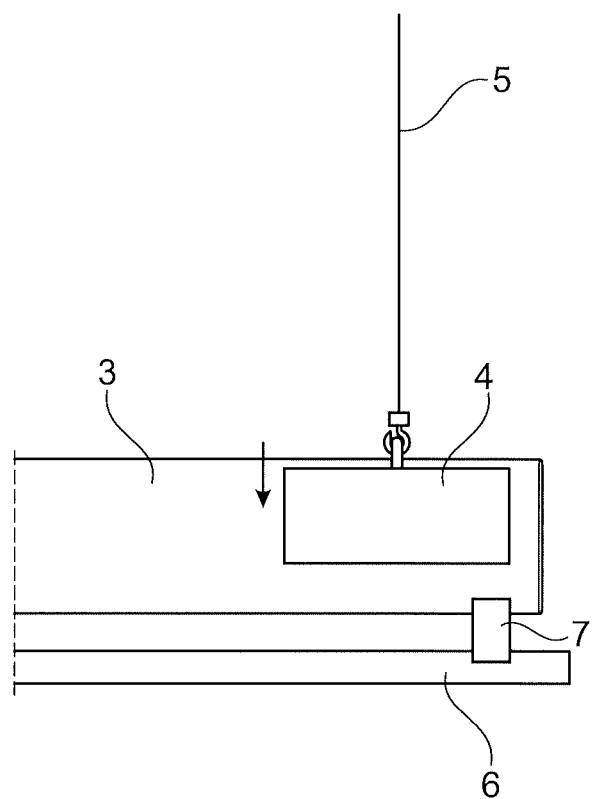

Furthermore, the method provides at least two damper units 4 configured to dampen oscillations of the turbine tower 1. FIGS. 1A and 1B illustrate attachment of one of the at least two damper units 4 to one of the plurality of the tower sections 3 on an outside thereof. In FIG. 1A, a damper unit 4 is attached to the tower section 3 on an outside thereof in a 12 o'clock position, a damper unit 4 in FIG. 1B is attached to a tower section 3 on an outside thereof in a 9 o'clock position as viewed from the right hand side of FIG. 1B.

The damper unit 4 is attached to the tower section 3 by lowering (indicated by the arrow) the damper unit 4 towards the tower section 3 by use of a hoisting system 5.

The tower section 3 while on the ground 6 is arranged on a support structure 7.

Figure 2:
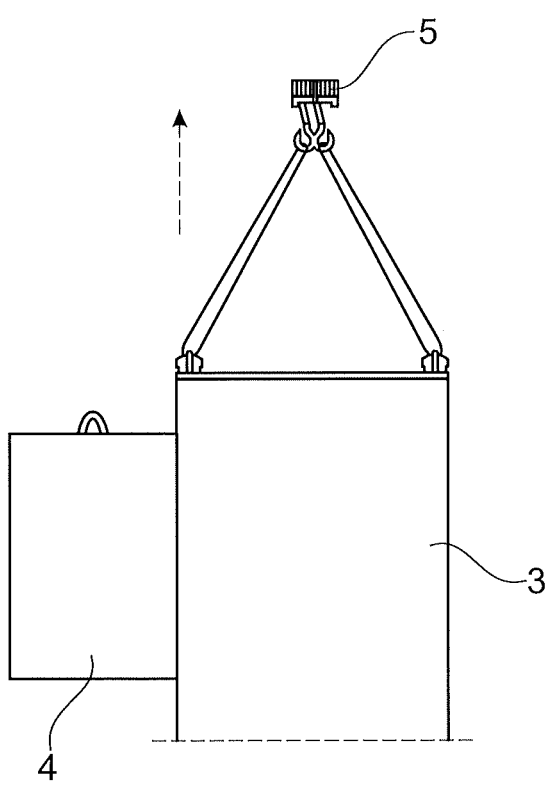
FIG. 2 illustrates lifting of a tower section with a damper unit attached on the outside of thereof.

FIG. 2 illustrates lifting of a tower section 3 with a damper unit 4 attached to an outside thereof. The tower section 3 is lifted by a hoisting system 5 and subsequently arranged on top of the tower structure on the uppermost tower section in the tower structure.

Figure 3:
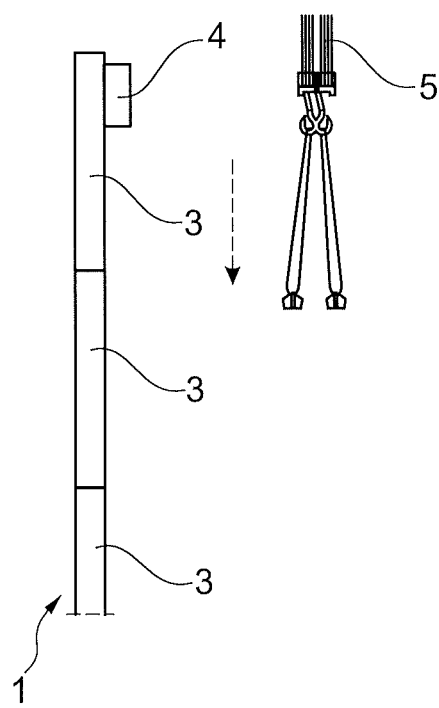
FIG. 3 illustrates lowering of the hoisting system.

FIG. 3 illustrates lowering of the hoisting system 5 after arranging a tower section 3 in the tower structure comprising three tower sections 3 forming the turbine tower 1. A damper unit 4 is attached to the tower section 3 which has being arranged before lowing the hoisting structure 5.

Figure 4A:
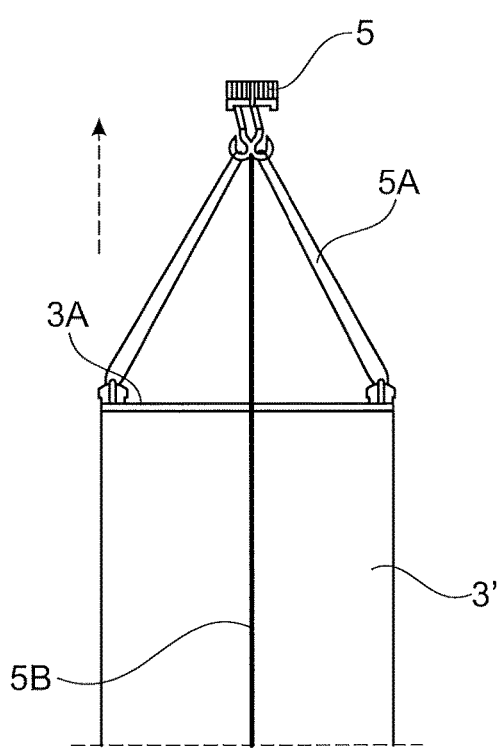
FIGS. 4A and 4B illustrate lifting of a tower section, and subsequent lowering of a damper unit.
Figure 4B:
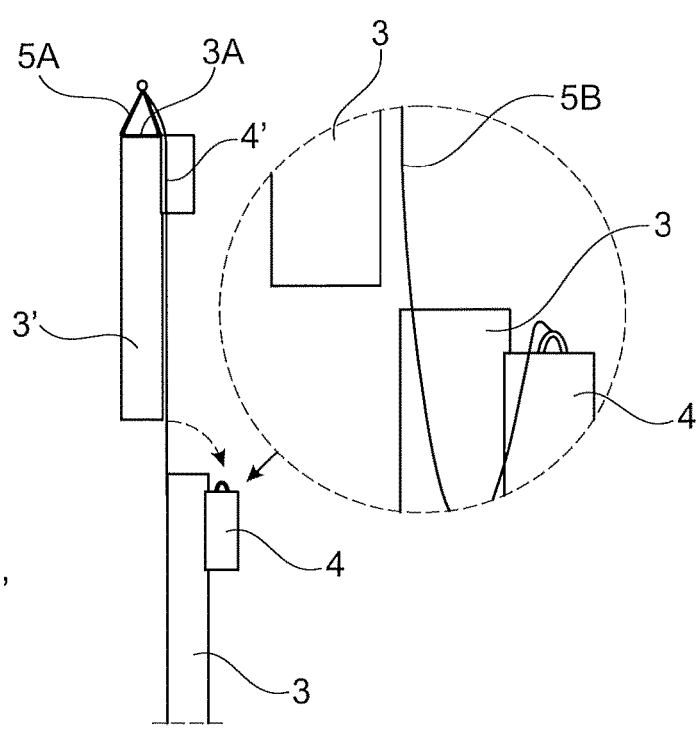

FIGS. 4A and 4B illustrate lifting of a tower section 3' (see FIG. 4A), and subsequent attachment of the hoisting system 5 to the damper unit 4 (see FIG. 4B) on the tower section 3 already in the tower structure. In the illustrated embodiment, the hoisting system 5 comprises a tower section lifting sling 5A and a damper unit lifting sling 5B. The damper unit lifting sling 5B has a length exceeding the height of the lifted tower section 3'. Consequently, the step of attaching the hoisting system 5 to a damper unit 4 can be carried out while the hoisting system 5 is attached to an upper end 3A of the lifted tower section 3'. Personnel who are assisting in the attachment of the lifted tower section 3' to another tower section 3 already in the tower structure and to which tower section 3, the damper unit 4 is attached, are located on a platform (not shown) just below the top of the tower section 3 already in the tower structure. The damper unit 4 is accessible to the personnel that can reach the damper unit lifting sling 5B and attach it to the damper unit 4 safely before the lifted tower section 3' is aligned with the tower structure.

Figure 5:
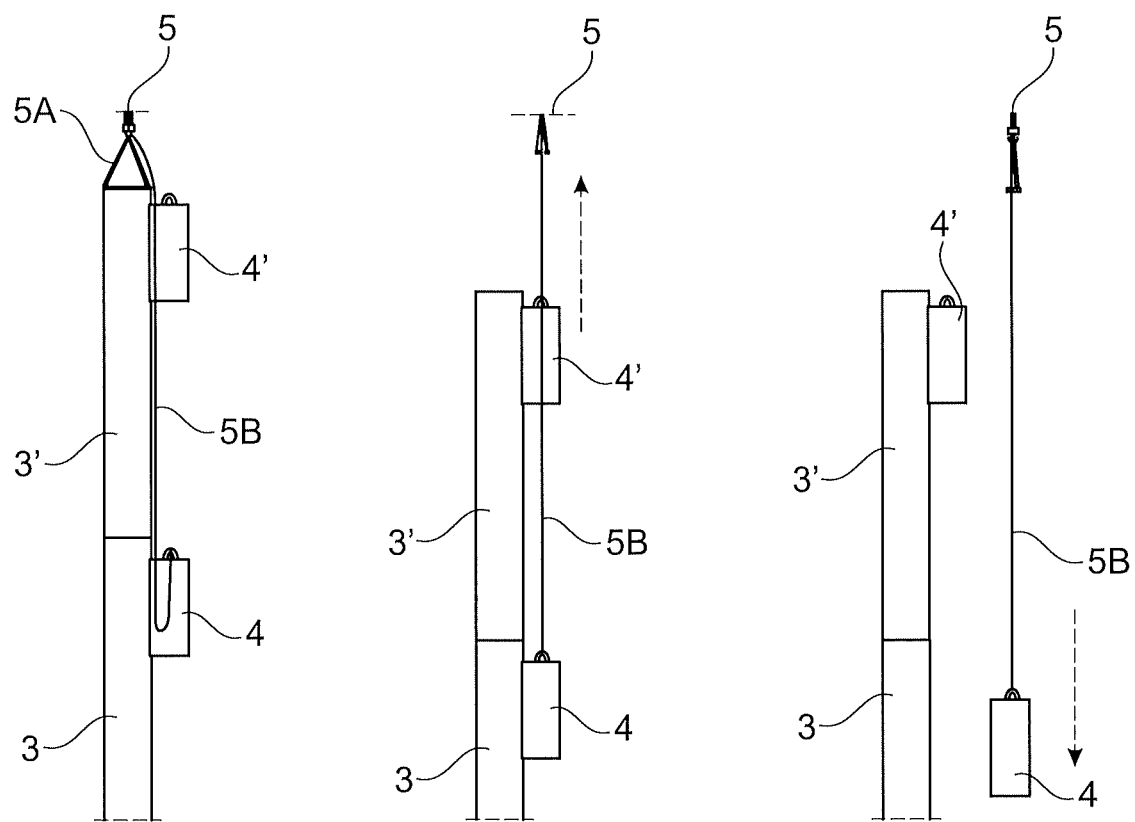
FIG. 5 illustrates positioning of a tower section, and subsequent lowering of a damper unit.

FIG. 5 illustrates the steps following attachment of the damper unit lifting sling 5B in to the damper unit 4 in FIG. 4B after positioning of a tower section 3' with a damper unit 4', and subsequent lowering of a damper unit 4. In the left part of FIG. 5, a tower section 3' with a subsequent damper unit 4' has just been arranged on top of another tower section 3 with a damper unit 4. The tower section lifting sling 5A is attached to the upper one of the tower sections 3', whereas the damper unit lifting sling 5B is attached to the lower one of the damper units 4.

In the centre of FIG. 5, the tower section lifting sling 5A has been released from the upper tower section 3'. The hoisting system 5 is lifted as indicated by the arrow to facilitate determination of tension in the hoisting system 5. By sensing tension in the hoisting system 5, it may be possible to detect whether the damping unit 4 is attached to the hoisting system 5 and fully supporting the weight of it.

In the right part of FIG. 5, the lower damper unit 4 has been released from the lower tower section 3 and is lifted to the ground by the hoisting system 5 while being attached to the damper unit lifting sling 5B.

Figure 6:
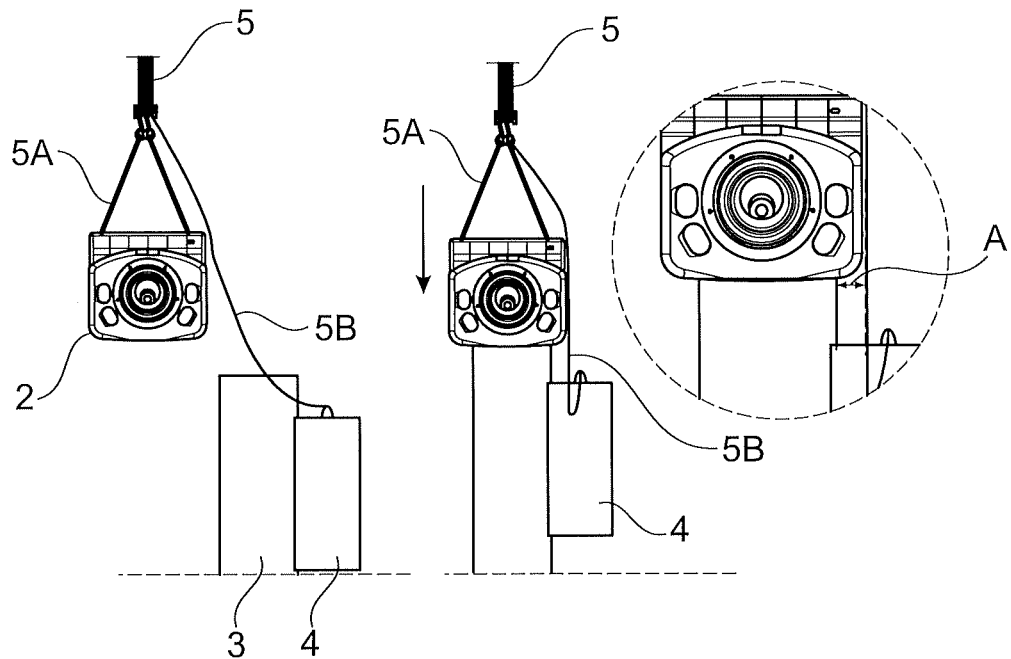
FIG. 6 illustrates lifting and positioning of a nacelle.

FIG. 6 illustrates lifting and positioning of a nacelle 2 on top of the uppermost tower section 3 by use of a hoisting system 5. The above described tower section lifting sling 5A is attached to nacelle 2 to thereby arrange the nacelle 2. In the same lifting step, the damper unit lifting sling 5B is attached to the damper unit 4 attached to the uppermost tower section 3. As indicated by the arrow A, the width of the part of the nacelle 2 that extends outside the tower is smaller than the distance between the tower 3 and the attachment point to the damper 4 of the damper unit lifting sling 5B. Therefore, the damper unit 4 can be lifted without interference between the damper unit lifting sling 5B and the nacelle 2 during lifting of the damper unit 4.

Figure 7:
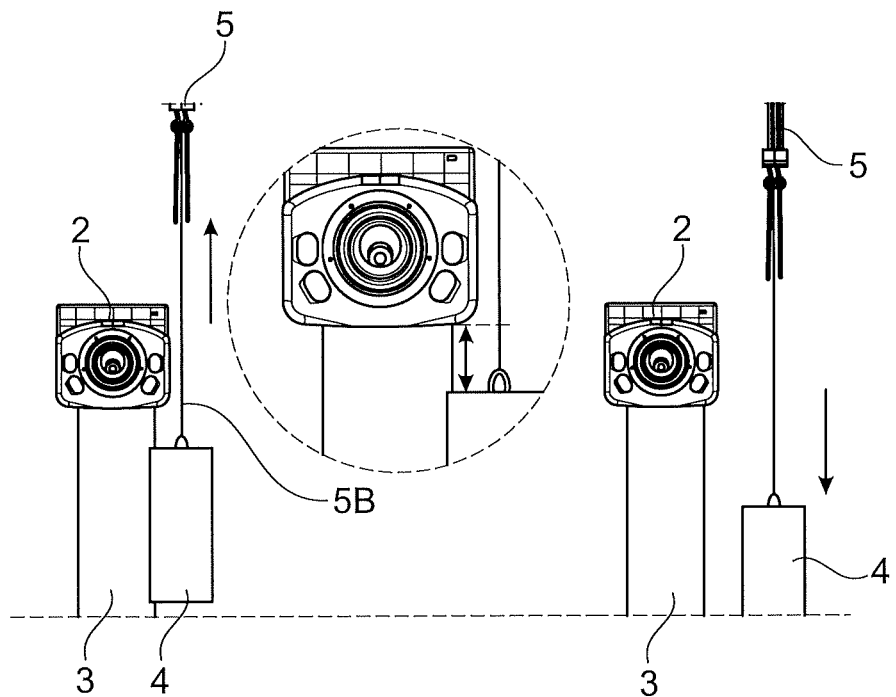
FIG. 7 illustrates lowering of a damper unit.

FIG. 7 illustrates lowering of a damper unit 4 after release of the damper unit 4 from the uppermost tower section 3. As illustrated by the arrows, the hoisting system 5 is lifted to facilitate determination of tension in the hoisting system 5 to ensure that the weight of the damper unit 4 is fully supported by the hoisting system 5. Then the damper unit 4 is released from the tower section 3 before it is lowered to the ground.

Figure 8A:
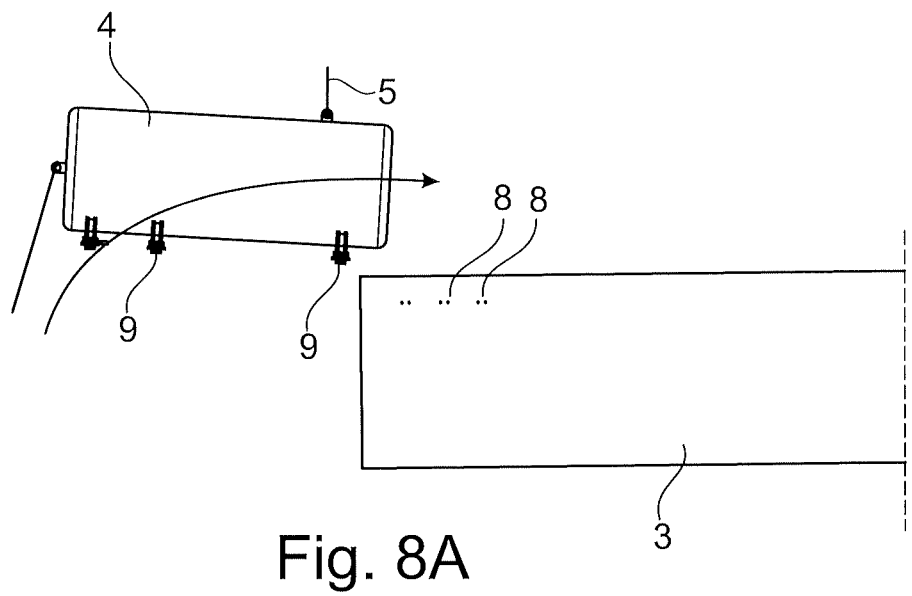
FIGS. 8A and 8B illustrate attachment of a damper unit to a tower section on ground.
Figure 8B:
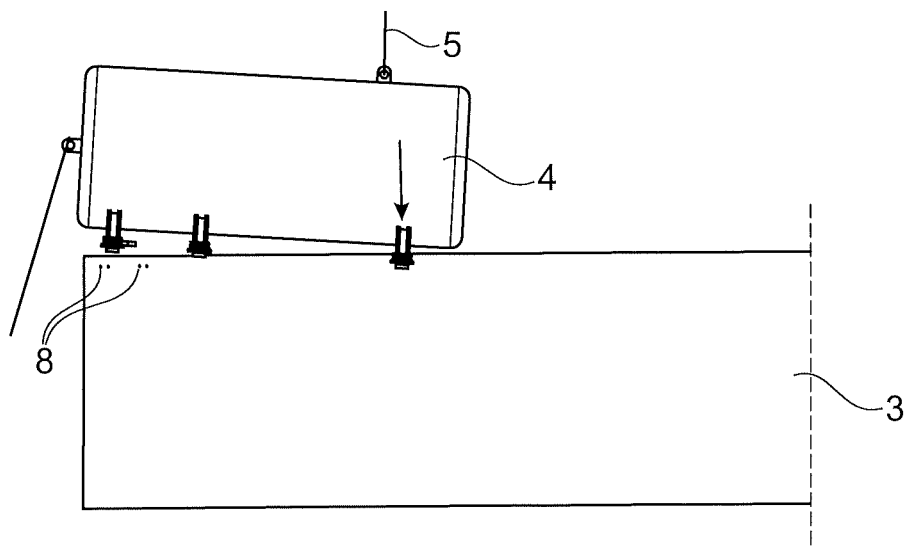

FIGS. 8A and 8B illustrate attachment of a damper unit 4 to a tower section 3 in a horizontal orientation on the ground. The tower section 3 comprises a plurality of through holes 8 in a wall of the tower section to allow fixing of the damper unit 4 to the tower section 3 by a locking structure 9 extending through the through holes 8. The locking structure 9 forms part of the damper unit 4, whereby it can be inserted into the thought holes 8 when aligning the damper unit 4 with the tower section 3.

Figure 9:
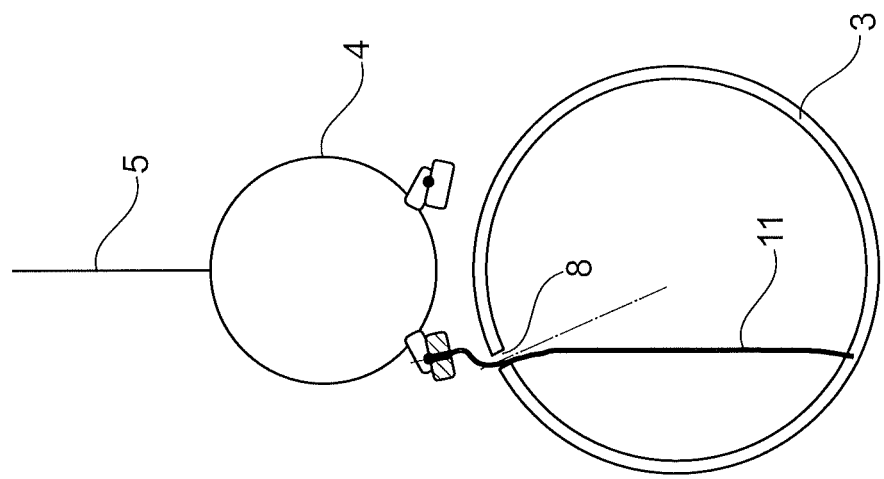
FIG. 9 illustrates different embodiments of attachment of a damper unit to a tower section.
Figure 9:
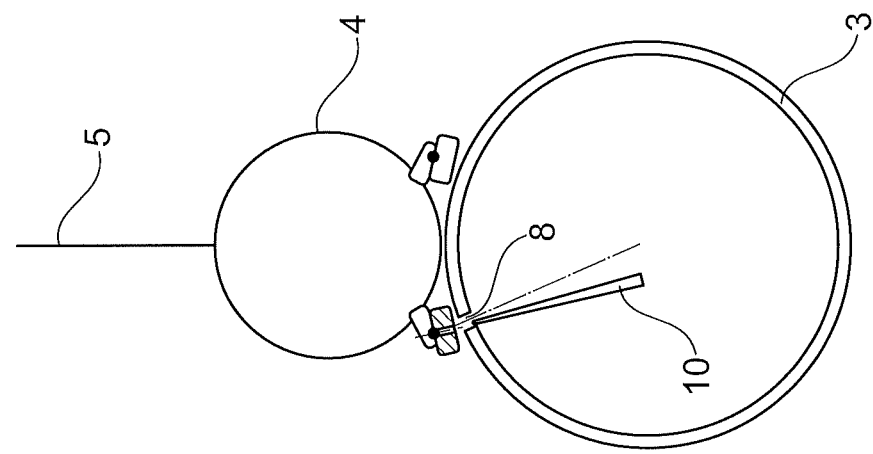
Figure 9:
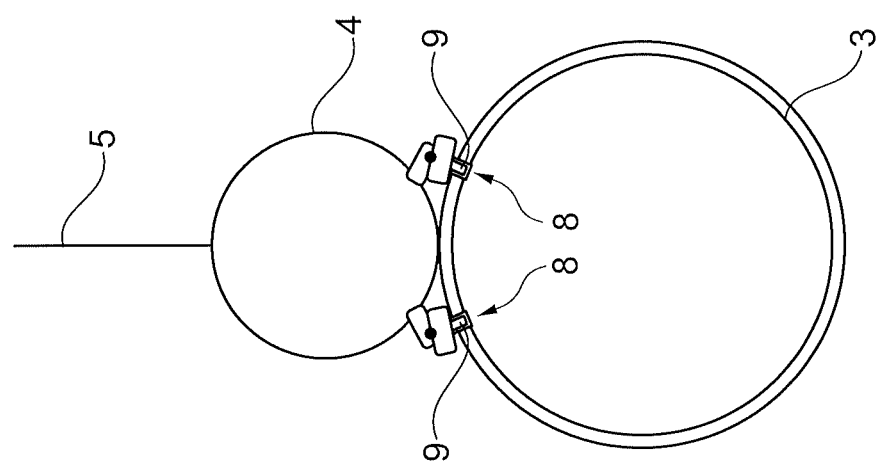

FIG. 9 illustrates different embodiments of attachment of a damper unit 4 to a tower section 3. The tower section 3 comprises a plurality of through holes 8 in a wall of the tower section. In the left part of FIG. 9, a locking structure 9 extends through each of the through holes 8 to thereby fix the damper unit 4 to the tower section 3. In the centre par of FIG. 9, a manual guide pin 10 is used to guide the damper unit 4 into position. Subsequently to the positioning, a locking member (not shown) may be inserted into the through hole 8. In the right part of FIG. 9, a guiding line 11 is used to guide the damper unit 4 into position. A worker inside the tower section 3 may pull the guiding line 11 to position the damper unit 4, and subsequently to the positioning, a locking member (not shown) may be inserted into the through hole 8.

The locking structure 9 is configured such that it can be released from the inside of the tower section 3. This makes is possible to release the damper unit 4 upon attachment of a subsequent tower section 3', see FIG. 5, where the damper unit 4, and in particular any hoisting points or external connections to the tower, can no longer be reached by personnel from inside of the tower section 3.

Figure 10:
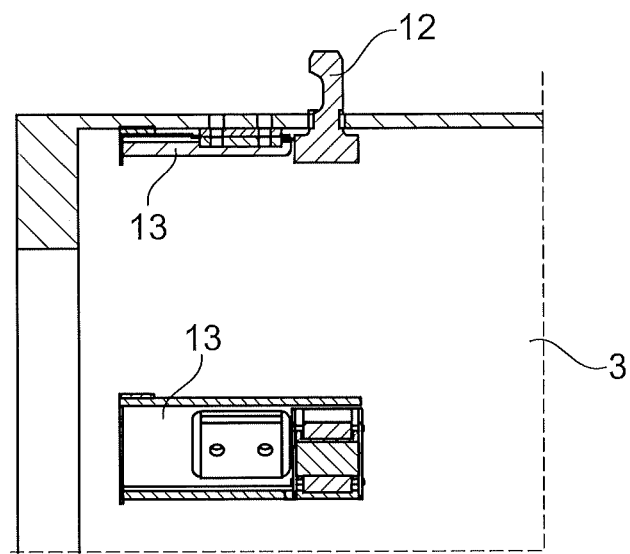
FIG. 10 illustrates a shelf support for a damper unit.

FIG. 10 illustrates a shelf support 12 for a damper unit 4. The shelf support 12 is attached to a wall of the tower section 3. In the illustrated embodiment, the shelf support 12 extends from the inside to the outside of the tower section 3, and comprises a reinforcement element 13 on the inside. The damper unit (not shown) is attached to the tower section by engagement between the shelf support 12 and a part of the damper unit.

Figure 11:
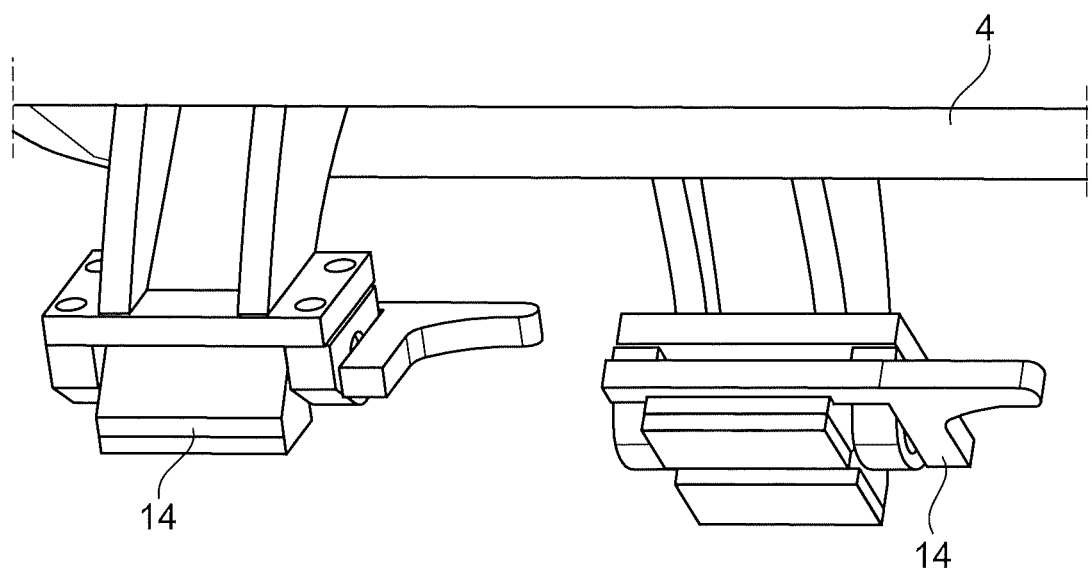
FIG. 11 illustrates pivoting structures for alignment of a damper unit.

FIG. 11 illustrates pivoting structures 14 for alignment of a damper unit 4 with a tower section (not shown). The pivoting structures 14 are arranged between the damper unit 4 and the tower section. As illustrated, the pivoting structures 14 are provided as feet attached to the damping unit 4. The feet engage the outside surface of the tower section and pivots to automatically assume the best angle of contact. Consequently, the damping unit 4 may be aligned with tower sections of different size and/or different outer geometry.

Figure 12:
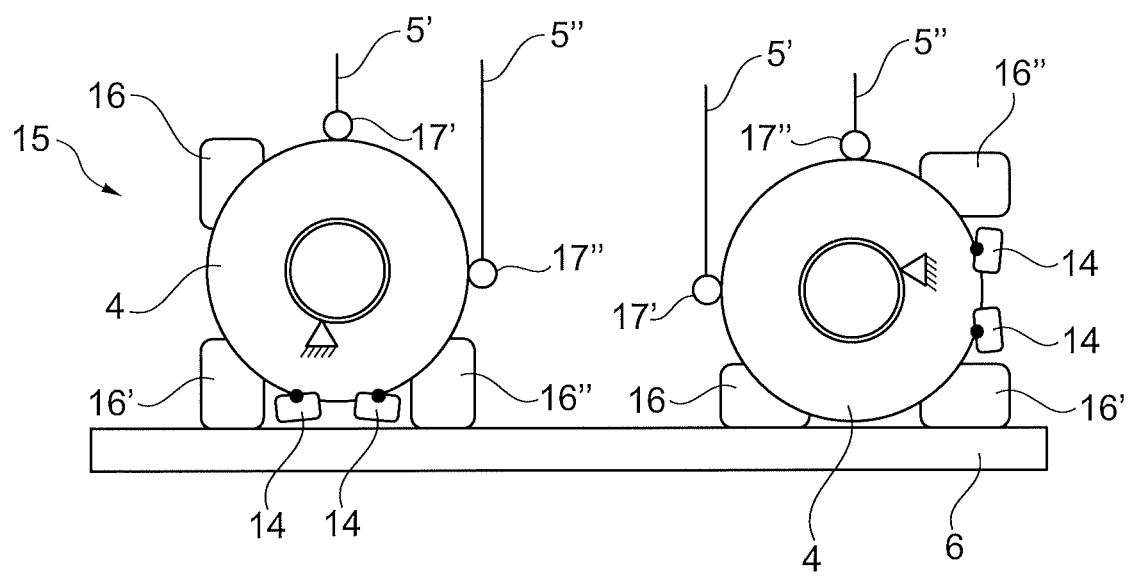
FIG. 12 illustrates rotation of a damper unit on ground.

FIG. 12 illustrates rotation of a damper unit 4 on ground 6. The damper unit 4 is located in a support structure 15. When the damper unit 4 has to be rotated, the damper unit 4 is lifted together with the support structure 15 by the hoisting system 5. The rotational movement of the damper unit 4 may be carried out to prepare the damper unit 4 for attachment to the tower section according to the orientation of said tower section. For example attachment to a 3 o'clock, 9 o'clock or 12 o'clock position on the tower section before lifting the tower section with the damper unit 4 and arranging it in the tower structure.

The support structure 15 has three support parts 16, 16', 16" and two attachment points 17', 17" for lifting slings 5', 5". To rotate the damper unit 4 from the orientation in the left part of FIG. 12 to that on the right part of FIG. 12, the lifting sling 5" attached to the lifting point 17" is tensioned until the damper unit 4 begin to rotate about the corner support part 16'. Upon further tensioning of the lifting sling 5' the damper unit 4 will rotate 90 degrees to assume the position on the right part of FIG. 12. This provides for a safe and easy rotation of the damper unit 4.

The invention claimed is:

1. A method of erecting a wind turbine on a wind turbine site, the wind turbine comprising a turbine tower and a nacelle, the method comprising the following steps:
    providing a plurality of tower sections being arrangeable upon each other in a vertical orientation in a tower structure to form the turbine tower,
    providing at least one damper unit configured to dampen oscillations of the turbine tower, wherein the at least one damper unit includes a damper unit structure, a pendulum, and a suspension arrangement for suspending the pendulum from the damper unit structure,
    attaching the at least one damper unit to one of the plurality of tower sections on an outside thereof such that the at least one damper unit is mounted to and carried by the one of the plurality of tower sections, and subsequently arranging the one of the plurality of tower sections in the tower structure, and arranging the nacelle on top of the tower structure while the at least one damper unit is attached to the one of the plurality of tower sections in the tower structure.

2. The method of claim 1, wherein the nacelle is attached to a tower section lifting sling of a hoisting system to arrange the nacelle on top of the tower structure.

3. The method of claim 2, wherein the tower section lifting sling of the hoisting system is attached to the at least one damper unit before the nacelle is arranged on the tower structure.

4. The method of claim 3, wherein the tower section lifting sling is released from the nacelle, and wherein the damper unit lifting sling is then used to release the at least one damper unit from the one of the plurality of tower sections.

5. The method of claim 4, wherein the at least one damper unit is lowered to the ground after it is released from the tower section.

6. The method of claim 1, wherein the width of a part of the nacelle that extends outside the tower section is smaller than the distance between the tower and an attachment point to the at least one damper unit of the damper unit lifting sling such that the at least one damper unit can be lifted without interference between the damper unit lifting sling and the nacelle during lifting of the at least one damper unit.

7. The method of claim 1, wherein the step of attaching the at least one damper unit to the one of the plurality of the tower sections on an outside thereof comprises a step of providing at least one through hole in a wall of the one of the plurality of tower sections and fixing the at least one damper unit to the one of the plurality of tower sections by a locking structure extending through the through hole.

8. The method of claim 1, wherein the step of attaching the at least one damper unit to the one of the plurality of the tower sections on an outside thereof comprises a step of providing at least one shelf support on an outer surface of the one of the plurality of tower sections and fixing the at least one damper unit to the one of the plurality of tower sections by engagement between the shelf support and a part of the at least one damper unit.

9. The method of claim 1, wherein the step of attaching the at least one damper unit to the one of the plurality of the tower sections on an outside thereof comprises a step of providing at least one pivoting structure between the at least one damper unit and the one of the plurality of tower sections and aligning the at least one damper unit by reorienting the pivoting structure relative to the one of the plurality of tower sections.

10. The method according to claim 1, wherein a damping frequency of the at least one damper unit is variable, and the method comprises a step of varying the damping frequency in dependency of the natural frequency of the tower structure.

11. The method according to claim 1, wherein the damper unit structure encloses the pendulum.

12. The method according to claim 1, wherein the one of the plurality of tower sections has a first end and a second end, and wherein the pendulum of the at least one damper unit is positioned between the first and second ends when the one of the plurality is tower sections is arranged in the tower structure.

* * * * *